United States Patent [19]

Blumenthal

[11] 3,870,787

[45] Mar. 11, 1975

[54] PIGMENT AND PREPARATION THEREOF

[75] Inventor: Warren B. Blumenthal, North Tonawanda, N.Y.

[73] Assignee: N. L. Industries, Inc., New York, N.Y.

[22] Filed: Nov. 5, 1973

[21] Appl. No.: 413,178

[52] U.S. Cl. ............... 423/598, 423/593, 106/299, 106/306
[51] Int. Cl. ......................... C01g 23/00, C09c 1/36
[58] Field of Search ............ 106/299, 306; 423/593, 423/598

[56] References Cited
UNITED STATES PATENTS

| | | | |
|---|---|---|---|
| 2,033,707 | 3/1936 | Harshaw et al. | 423/598 |
| 2,346,296 | 4/1944 | Espenschred | 106/299 |
| 2,936,216 | 5/1960 | Merker | 423/598 |

Primary Examiner—Delbert E. Gantz
Assistant Examiner—J. V. Howard
Attorney, Agent, or Firm—Ashlan F. Harlan, Jr.

[57] ABSTRACT

Novel crystalline compounds, particularly useful as pigments, having a composition corresponding to the formula $CaTiZr_3O_9$ and distinctive X-ray diffraction patterns. One such compound can be produced by calcining to a temperature of at least 1,250°C an intimate mixture of the oxides of Ti, Ca, and Zr in approximately the atomic ratio of 1:1:3. Another such compound can be produced only by calcining, at a temperature of at least 600°C and preferably from about 800°C to about 1,000°C, a chemically homogeneous conglomerate which consists essentially of Ca, Ti, Zr, and O and at least one thermally fugitive ligand per atom of metal present. The Ca, Ti and Zr are preferably in the atomic ratios of 1:1:3 and oxygen is present in the amount necessary to form the highest oxides of the three metals. Chemically homogeneous conglomerates suitable for the production of such compound are obtainable by coprecipitation or by the evaporation of solutions.

15 Claims, No Drawings

PIGMENT AND PREPARATION THEREOF

BACKGROUND OF THE INVENTION

This invention relates to novel compounds of calcium, titanium, zirconium and oxygen which have been found very useful, particularly as pigments, and to processes for preparing such compounds.

Pigments have been widely used for a large variety of purposes for milennia. During this period, a great many materials have been tried as pigments with greater or less success and at the present time a considerable number of materials are in commercial use as pigments. It will be appreciated, however, that all pigments are not suited or usable for all purposes. Thus, for a specific use one pigment may be superior to another because of its better color or its greater hiding power. On the other hand, for another specific use the greater tinting strength of one pigment may cause it to be preferred to another. Consequently, there is a continual search for new pigment materials and for modifications of known pigments which will result in making available for use pigments having novel or improved properties.

Among the known and extensively used pigment materials is titanium dioxide ($TiO_2$). This material is white and, as a pigment, has very great hiding power. Also previously suggested for use as a white pigment, is zirconium dioxide ($ZrO_2$). Although this compound is used to a limited extent as a pigment, it suffers from the disadvantages that not only is it considerably more expensive than titanium dioxide, but it also has less covering power and tinctorial strength. Other white or light colored metal oxides have been suggested for use as pigments and some of these such as zinc oxide (ZnO) and antimony oxide ($Sb_2O_3$) have been so used, zinc oxide, for example, being employed quite extensively. However, some common, white, metal oxides are substantially lacking in desirability for pigmentary use. Calcium oxide (CaO) is a good example of this. This oxide, while inexpensive, is unusable per se as a pigment because of its chemical reactivity with water and many paint vehicles. Although the reaction product of CaO with water, calcium hydroxide ($Ca(OH)_2$), is used to some extent as a pigment, for example in the so-called "whitewash," the pigmentary properties of the hydroxide are of very low quality.

Although some compositions containing two or more of the oxides $TiO_2$, $ZrO_2$, and CaO, including a rare mineral containing all three oxides in substantially the same proportions as the products described herein are known, it has been discovered that novel compounds of these oxides can be produced by the procedures herein disclosed. These novel products, when finely divided, are useful as pigments and one such product provides an excellent white pigment with an unexpectedly good combination of pigmentary properties. In fact, in one respect or another, it is a better pigment than any one of the three constituent oxides.

SUMMARY OF THE INVENTION

The novel, crystalline compounds of the present invention have been found to have a composition that can be represented by the formula $CaTiZr_3O_9$, and distinctive X-ray diffraction patterns. One of said novel compounds can be produced from an intimate mixture of calcium carbonate, titanium dioxide and zirconium dioxide in the molar ratio 1:1:3 by calcining the mixture to a temperature of about 1,400°C. Another of such novel compounds can be produced by calcining, to a temperature of at least 600°C and not substantially above about 1,000°C, a conglomerate which is chemically homogeneous and consists essentially of Ca, Ti, Zr and O and at least one thermally fugitive ligand per atom of metal component, said calcination being for a period of at least 2 hours at 600°C. The Ca, Ti, and Zr in the conglomerate are preferably in the atomic ratios of 1:1:3 and the oxygen is present in amount necessary to form the highest oxide of each of the three metals. The novel compounds when finely divided are useful as pigments. The second mentioned compound, because of its excellent whiteness and covering power, is particularly desirable as a replacement for $TiO_2$ pigments for certain uses.

DESCRIPTION OF THE INVENTION

The novel crystalline compounds of the present invention which, as stated above, have compositions that can be represented by the formula $CaTiZr_3O_9$, are substantially colorless or very light in color. The density of the novel compounds is approximately 4.98 g/cm$^3$; the melting point is approximately 2,200°C, the index of refraction is approximately 2.20, and they are insoluble in both water and organic solvents. The absorption spectrum of one of the novel products shows practically no light absorption over the entire visible range, a fact which accounts for its extraordinary whiteness as a pigment.

The most prominent $d$ spacings in the X-ray spectrogram obtained by X-ray powder diffraction analysis of a typical product produced in accordance with the process described below in Example 1 by calcination of an intimate mixture of finely divided calcium carbonate, titanium dioxide, and zirconium dioxide in a 1:1:3 molar ratio at about 1,400°C are set forth in Table A below.

TABLE A

| d | R.I. |
|---|---|
| 7.56 | 7 |
| 3.48 | 11 |
| 2.93 | 100 |
| 2.53 | 21 |
| 2.17 | 6 |
| 1.79 | 51 |
| 1.65 | 6–7 |
| 1.59 | 5 |
| 1.53 | 30 |
| 1.46 | 5–6 |

In Table A, as also in other tables of $d$ spacings occurring hereinafter, the figures in the column "R.I." are the intensities of the several diffracted reflections in the X-ray spectrogram relative to the intensity of the strongest reflection therein. Table A lists all of the $d$ spacings for which there is an R.I. in the X-ray spectrogram greater than 5.

On the other hand, a typical product produced, for example in accordance with the process described below in Example 2, by calcination of a chemically homogeneous conglomerate, upon X-ray diffraction analysis, gives an X-ray spectrogram the most prominent $d$ spacings of which are set forth below in Table B.

TABLE B

| d | R.I. |
| --- | --- |
| 2.93 | 100 |
| 2.53 | 16 |
| 1.79 | 34 |
| 1.53 | 19 |

It will be evident that the X-ray spectrograms of Tables A and B distinguish clearly between the two products since not only are there in the spectrogram of the second-mentioned product (Table B) no peaks of relative intensity as great as 5 other than those shown, but also the relative intensities of the peaks shown are markedly different from the relative intensities of the same peaks in the spectrogram of the first-mentioned product (Table A).

As stated above, in a particle size range suitable for pigment use, the second of the novel products is a bright, clean white. It has a brightness of 93.3 on the Gardner Color Difference Meter, somewhat higher than the 92.5 – 92.9 brightness of $TiO_2$. Its reflectance, measured on a reflectometer, is about equal to that of $TiO_2$. It has very good hiding power, though somewhat less as determined in a standard comparative drawdown test, than $TiO_2$. The first-mentioned novel product, in pigment size, is not as white as the second-mentioned one but usually is a light tan or cream color that is quite suitable for use in a primer, even under white second coats.

A chemically homogeneous conglomerate suitable for the preparation of a novel compound of the second type mentioned above consists essentially of Ca, Ti, Zr, and O and at least one thermally fugitive ligand per atom of metal component. The Ca, Ti, and Zr are preferably present in a 1:1:3 atomic ratio and the oxygen is present in the amount necessary to form the highest oxides of the three metals.

A "chemically homogeneous" conglomerate as the term is used herein is one in which the distances separating the metal-oxygen moieties contained therein are of the order of molecular distances typical of molecules or the ions of salts. A "thermally fugitive" ligand as the term is used herein is one which under the conditions of the present process, volatilizes as such or is wholly converted with or without oxidation, into products that volatilize. A chemically homogeneous conglomerate of the type described above can be formed by evaporation of a solution of appropriately chosen compounds containing the metals or by coprecipitation of suitable compounds of the metals.

It will be understood that while as stated above the Ca, Ti, and Zr in the novel compounds are preferably present in a 1:1:3 atomic ratio and the oxygen is present in the amount required to form calcium oxide and the dioxides of titanium and zirconium, analyses of the products obtained differ to a small extent at times. The difference may be due to one or more of several causes, e.g., error in analysis, error in preparing the raw batch, or incomplete reaction. In any event, however, it has been found that a product in which even approximately the desired composition is obtained is of great utility as a pigment since its properties are virtually the same as those of the substantially pure material except for a dilution factor. It should be noted that the impurities that may occur in the products, such as $TiO_2$, $ZrO_2$, $CaTiO_3$, and $CaZrO_3$ are, like the novel compounds, water-insoluble compounds that are substantially white in finely divided form. Accordingly, it will be appreciated that the present invention comprehends products which are of substantially the preferred composition and possess essentially the other characteristics set forth above.

There is described below a typical example of the production of a novel compound of the type first mentioned above.

EXAMPLE 1

An intimate mixture was formed from:

| | Parts | Moles |
| --- | --- | --- |
| $ZrO_2$ (−325 mesh) | 15.0 | 0.121 |
| $TiO_2$ (0.2 – o. 3$\mu$) | 3.2 | 0.040 |
| $CaCO_3$ (−325 mesh) | 4.0 | 0.040 |

The mixing was carried out by grinding the powders together with enough distilled water to make a stiff paste. The paste, after completion of mixing, was placed in a platinum crucible and heated in an oxidizing atmosphere to 1,400°C, a temperature well above the temperature at which $CaCO_3$ decomposes to form $CaO$ and $CO_2$. After heating the oxides at that temperature for an hour, the product was cooled in the furnace. The product was lightly sintered but could be ground to a cream-colored powder in a mortar. The powder was found to have an X-ray spectrogram substantially identical to that shown in Table A.

Examples 2 – 6, inclusive, below, describe several procedures for the production of the second-mentioned of the present novel compounds which are particularly useful as white pigments.

EXAMPLE 2

168.9 g of a 70 percent aqueous glycolic acid solution was diluted with water to 250 ml. While stirring, 250 ml of an aqueous zirconium oxychloride solution containing 167.4 g of $ZrOCl_2 \cdot 8H_2O$ was added over a period of 5 minutes. After standing, the slurry containing the resultant precipitate was filtered. The filter cake was washed with distilled water and then redispersed in distilled water. For each 0.3 gram atom of zirconium in the precipitate, 0.1 mole of calcium oxide was slowly stirred into the acid slurry (initial pH of about 2). After adjusting the pH to 7 with ammonium hydroxide, a solution of calcium ammonium triglycolatozirconate was obtained. With this solution there was thoroughly mixed a solution formed by dissolving 1 mole of hydrous titania in 3 moles of 70 percent aqueous glycolic acid solution. The resultant mixed solution was evaporated to substantial dryness and further dried at 200°C to form an amorphous, clear glassy mass. This homogeneous conglomerate was broken up and calcined in a gas-fired kiln for 3 hours at about 1,000°C in an oxidizing atmosphere. The thermally fugitive ligands of the conglomerate were essentially $H_2O$, $NH_3$, and glycolato ($-OCH_2CO_2-$). The product obtained from the calcination was a lightly sintered, fragile mass which was easily crushed to a finely divided white powder by passage under a roller. The X-ray diffraction pattern of the product was substantially identical to that set forth in Table B. By chemical analysis the mol ratios of the oxides, $ZrO_2$, $TiO_2$, and $CaO$, were determined to be 3:1:0.9.

EXAMPLE 3

A precipitate of zirconium lactate was prepared by mixing an aqueous solution of 0.3 mole zirconium oxychloride ($ZrOCl_2$) assaying 17.9% $ZrO_2$ with 0.9 mole of lactic acid ($H_6C_3O_3$). The resulting thick slurry was filtered and the precipitate was washed with distilled water and reslurried therein. To the second slurry, which had a pH of about 1.85, there was slowly added 0.1 mole calcium oxide with stirring. During this addition, the pH increased and was finally adjusted to 7.5 by addition of $NH_4OH$. The calcium ammonium trilactatozirconate formed was completely soluble in the water present. A solution of titanium oxalate was prepared by stirring 0.15 mole of oxalic acid into 100 ml of an aqueous titanium chloride solution containing approximately 0.1 gram atom of titanium. Sufficient water was added to ensure complete solution of the oxalic acid. This solution was run into about 4 times its volume of water simultaneously with a 50% $NH_4OH$ solution at such a rate as to maintain the pH of the mixture at 9.0. The resulting precipitate was filtered and washed with distilled water and was then dissolved in 0.37 mole of lactic acid ($H_6C_3O_3$), as an 85 percent aqueous solution, to form a titanium lactate solution.

The solution of the titanium lactate was stirred thoroughly into the solution of calcium ammonium zirconium lactate and the mixture was dried at 150°C. The resulting homogeneous and transparent glassy conglomerate, after being broken up, was heated in air in an electric furnace for 3 hours at 1,000°C. The calcination removed the thermally fugitive ligands $NH_3$, $H_2O$, and lactato ($-OCHCH_3CO_2-$).

The product obtained was a lightly coherent compact which was readily crushed to a fine white powder having the same characteristic peaks and substantially the same relative intensities thereof in its X-ray diffraction spectrogram as the product of the preceding example.

In the following embodiments coprecipitation was employed to form the chemically homogeneous conglomerate to be calcined.

EXAMPLE 4

An aqueous solution containing 1 mole of titanium and 3 moles of zirconium as their respective oxychlorides was mixed slowly into an aqueous solution containing 1 mole calcium chloride ($CaCl_2$) while maintaining the temperature at about 95°C and maintaining the pH of the mixture at above about 2.2 by addition of ammonium hydroxide ($NH_4OH$). The titanium and zirconium were completely coprecipitated as hydrous oxides. The calcium remaining in solution was thereafter precipitated by adjusting the pH of the hydrous oxide slurry to 8.0 and adding thereto 1 mol of ammonium oxalate (($NH_4)_2C_2O_4$ $H_2O$).

The resultant slurry, in which all three metals, Ti, Zr, and Ca have been precipitated, was cooled and filtered and the filter cake, after washing to remove chloride ions, was then dried at 150°C for about 16 hours. The resulting homogeneous conglomerate was calcined in air for 3 hours at about 1,000°C. A finely divided, white powder was obtained by crushing the fragile, slightly coherent body produced. The product was found, by X-ray diffraction, to be essentially the same as those produced in accordance with Examples 2 and 3, although it contained small, negligible amounts of zirconium dioxide ($ZrO_2$) and calcium titanate ($CaTiO_3$).

EXAMPLE 5

The procedure of Example 4 was substantially followed except that the calcining time of the conglomerate was only 1 hour. The product obtained was substantially the same as that of Example 4.

EXAMPLE 6

The procedure of Example 4 was substantially followed except that the calcining temperature for the conglomerate was 800°C and calcining time was 2 hours. Again, the product obtained was substantially the same as that of Example 4.

In the last three examples the thermally fugitive ligands of the conglomerate were $H_2O$, $NH_3$, and oxalato ($-C_2O_4-$).

Solutions that can be evaporated to form chemically homogeneous conglomerates containing Ti, Ca, and Zr suitable for producing the novel compound of the present invention can also be obtained by using hydroxycarboxylic acids other than lactic acid and glycolic acid, e.g., mandelic acid. Also, such solutions can be obtained by the use of other organic chelating agents with certain salts of the metals Ti, Zr, and Ca.

In calcining chemically homogeneous conglomerates such as those employed in Examples 2, 3 and 4, the reaction by which the novel white compound is produced is completed in about 2 hours at 600°C, and more rapidly at higher temperatures. A calcination temperature of about 1,000°C is preferred, but temperatures from 600°C to about 1,000°C can be used. If the conglomerate is calcined above about 1,000°C the color is, at least to some degree, affected deleteriously.

In the process set forth in Example 1 a calcination temperature of at least about 1,250°C is required and higher calcination temperatures up to about 1,800°C can be employed. However, it has been found that the pigmentary properties of the products are increasingly inferior as the calcination temperature is increased. Products substantially identical with the product of Example 1 can be obtained by increasing the calcination temperatures in the processes of Examples 2 – 6 to about 1,400°C or by heating the products obtained from such processes, in a non-reducing atmosphere, to above about 1,250°C, e.g., about 1,400°C.

The novel products of the present invention can be used in forming a substantially infinite number of pigmented compositions since they are readily incorporated with sprayable, spreadable, castable, and moldable materials, according to known practice. When used in paints or other coating compositions the light color of the pigments gives the compositions good heat-reflective properties. As shown below, they also are useful in primer compositions and have remarkably good anti-corrosion properties. Because of their non-toxic nature the present novel pigments can be employed in such compositions as cosmetics where lack of toxicity is important.

EXAMPLE 7

A metal primer composition was made in the following manner:

A vehicle was prepared by mixing:

| | |
|---|---|
| Epoxy resin (Epon 828) | 32 parts |
| Methyl ethyl ketone | 6 parts |
| Acetate of ethylene glycol monoethyl ether | 4 parts |
| Cyclohexane | 1 part |

Then a mixture of 5 parts of the vehicle, 5 parts of the pigment of Example 2, and 1.5 parts of a polyamide resin (Versamid 140) was ball milled for 4 hours to produce a smooth paint.

Mild steel test panels were coated with the paint and, after curing, were immersed in sea water for a period of months. The effectiveness of the primer composition was shown by the fact that at the site of a scratch through the coating to the metal surface, no under-creep of corrosion occurred over a period of three months. In contrast, when a similar steel panel was similarly coated with a paint identical to that described above except that the conventional rust preventive pigment, zinc chromate, was used instead of the present novel pigment, severe corrosion undercreep occurred at the site of a scratch through the coating when the panel was immersed and held in sea water for three months.

The novel pigments of the present invention are also useful in other coating compositions as shown by the following examples.

EXAMPLE 8

A mixture of 20 parts of liquid, aliphatic, moisture-curing polyurethane product (Reichold 13-345), containing 46 percent solids, and 10 parts of the pigment of Example 4 was made, the pigment being previously dried to less than 1 percent moisture. The resulting paint was brushed onto metal and plywood panels, the latter receiving two coats. After curing of the coatings, a set of coated panels was exposed to ultra-violet light while another set was exposed in a humidity cabinet. After 6 months exposure, no visible change had occurred in the coatings.

EXAMPLE 9

The procedure of Example 8 was repeated except that a liquid aromatic, moisture-curing polyurethane product (Reichold 13-300), containing 42 percent solids was used as the vehicle. This type of polyurethane is not regarded as weather-resistant, yet no visible change of the coatings on the test panel occurred in the ultra-violet and humidity cabinet tests during 6 months exposure therein, and even exposure for 7 – 12 months on an outside test rack produced no substantial change in the appearance of the panels.

EXAMPLE 10

A coating composition was formed in a pebble mill from 50 parts of the pigment of Example 4 and 100 parts of a liquid, acrylic-modified polyester (Reichold 32-032). Grinding of the mixture was carried on for 4 hours at room temperature. To the resulting dispersion there was added 1 part of a catalyst, methylethylketone peroxide. This was thoroughly blended in and the composition was then applied to plywood test panels, two coats being used. No visible changes in the condition of the coated test panels were produced by exposure to ultraviolet light, exposure in a humidity cabinet, or exposure on an outdoor test rack for 6 months.

EXAMPLE 11

A heat-resistant paint was prepared by dispersing, in a ball mill, 100 parts of the pigment of Example 4 in 150 parts of a liquid, chlorinated polyester (Hetron 353). With this dispersion there was mixed 1.5 parts of methylethylketone peroxide as a curing catalyst. The paint was applied to panels of sand-blasted mild steel and allowed to cure.

A comparative flame test was made with one of such coated panels and a similar panel coated with a paint identical with the one described except for the substitution of $TiO_2$ pigment for the pigment of this invention. The coatings on the test panels were exposed directly to the flame of a Bunsen burner. Although neither coating ignited, the coating containing the $TiO_2$ pigment scorched badly and the scorch could not be removed by mild abrasive action, while the coating with the pigment of the present invention was only slightly scorched and mild abrasive action removed the scorch.

EXAMPLE 12

A pigmented lacquer was prepared by dispersing 20 parts of the pigment of Example 4 in 10 parts of castor oil. The dispersion was then blended into 20 parts of a commercial nitrocellulose lacquer that contained about 27 percent of film forming ingredients. The resulting composition was readily brushed on a wood panel and was dried by heating. A well-adhering, white coating was obtained on the wood.

EXAMPLE 13

A water-thinnable, resin latex paint was prepared by dispersing 10 parts of the pigment of Example 4 in 40 parts of a vinyl latex liquid having a pH between 4.0 and 5.5 and containing polyvinyl acetate and a vinyl acrylic resin, the solids content of the liquid being about 55 percent. The resulting paint was readily brushed on a wood panel and allowed to air dry thereon. A well-adhering, durable, very white coating was obtained on the panel.

Pigmented resin compositions suitable for encapsulating electrical components can be prepared as shown by the following:

EXAMPLE 14

A mixture was prepared of 200 parts of a rigid orthophthalic polyester (Reichold 31-839), 100 parts of a flexible isophthalic polyester (Altec 3), 1 part of cobalt octoate catalyst, and 580 parts of a pigment according to the invention, prepared substantially as described in Example 4. The mixture was blended in a mixer for 10 minutes and allowed to cool. This resulted in a pourable composition having a viscosity of about 10,000 cps.

Suitably spaced aluminum elements were mounted in a suitable plastic mold and the resin-pigment mixture, after addition thereto of 1 percent of methyethylketone peroxide as a curing agent was poured into the mold around the aluminum elements. The filled molds were vibrated and subjected to a vacuum of 100 mm of mercury to remove air and were then held in a pressure chamber at about 5.25 kg/cm² until gelation occurred.

After 7 days curing at room temperature, the resulting pigmented resin block was tested. At 1,000 Hz and a temperature of 23°C it had a volume resistivity greater than $10 \times 10^{15}$, a dielectric constant of 6.36 and a power factor of 0.0081. This indicates suitability for use of the filled resin composition in encapsulating motor windings and in other electrical devices.

As mentioned above, the novel pigments of the present invention can also be used in admixture with other pigments in making pigmented compositions. This is illustrated in the following example.

EXAMPLE 15

An oil paint was prepared using, as a vehicle, boiled linseed oil containing conventional driers. In 100 parts of this vehicle were dispersed 200 parts of the pigment of Example 4 and 2 parts of a red organic toner. A dark pink colored paint was obtained. This paint was coated on a substrate and dried. It formed a well-adhering coating which showed somewhat less fading on exposure to sunlight than a paint made in the same way and with the same oil-pigment proportions but containing $TiO_2$ as a white pigment instead of the pigment of Example 6. Similar favorable results were obtained with a paint in which the pigment of Example 5 was used instead of the pigment of Example 6.

It has also been found that pigments according to the present invention are particularly useful in paints for electrocoating steel. In tests comparing $TiO_2$ and a pigment prepared substantially in accordance with Example 1 in an emulsion type paint, steel panels after electrocoating and drying were exposed to a salt fog for 72 hours. At the end of this exposure, the panel coated with the $TiO_2$ paint was found to have a dense coverage of small corrosion blisters while the panel coated with the paint containing the $CaTiZr_3O_9$ product had only a few small blisters.

Since they are relatively non-reactive, the novel compounds of the present invention can be used as pigments with all types of conventional vehicles, and thus are useful in a wide variety of coating compositions such as oil paints, latex paints, lacquers, varnish-base paints, enamels, etc. Tests have shown that the present novel pigments in suitable vehicles are quite effective in preventing or reducing corrosion when used as primers on steel surfaces. Because of their high reflectance, brightness, and hiding power, however, the white pigments are useful not only in primers, but in finishes and decorative coating compositions. As shown above, if desired, they can be mixed with other pigments in forming coating compositions. In addition to their usefulness in such compositions, the novel pigments may be used in resinous compositions such as are used as casting compounds for potting electrical or electronic components, and they can be readily blended into elastomeric compositions.

It will be understood that, as is usual in the manufacture of pigments, it is desirable to employ in the preparation of products according to the present invention relatively pure raw materials and to avoid materials that add or cause unwanted coloration. However, the small amount of hafnium, which in nature always accompanies zirconium and is very difficult to remove because of the extremely close similarity of the chemistries of the two elements, is not regarded as an impurity.

It will also be understood that because of the complexity of the $TiO_2$ - $ZrO_2$ - $CaO$ system, the exact nature of products in said system is often very difficult to determine. Consequently, as used herein, the term compound is intended to include a crystalline solid solution.

Parts and percentages as specified herein are parts and percentages by weight, except as otherwise indicated.

I claim

1. A crystalline compound having a composition which can be represented by the formula $CaTiZr_3O_9$ and characterized by an X-ray diffraction spectrogram, the most prominent $d$ spacings of which are as follows:

| d | R.I. |
| --- | --- |
| 7.56 | 7 |
| 3.48 | 11 |
| 2.93 | 100 |
| 2.53 | 21 |
| 2.17 | 6 |
| 1.79 | 51 |
| 1.65 | 6–7 |
| 1.59 | 5 |
| 1.53 | 30 |
| 1.46 | 5–6 | the relative intensities of the several listed diffracted reflections with respect to the intensity of the strongest reflection in the X-ray diffraction spectrogram of a typical product being as set forth in the column headed R.I..

2. A crystalline, colorless compound having a composition which can be represented by the formula $CaTiZr_3O_9$ and characterized, in its X-ray diffraction spectrogram, by substantial reflections as follows:

| d | R.I. |
| --- | --- |
| 2.93 | 100 |
| 2.53 | 16 |
| 1.79 | 34 |
| 1.53 | 19 | the relative intensities of the several listed diffracted reflections with respect to the intensity of the strongest reflection in the X-ray diffraction spectrogram of a typical product being as set forth in the column headed R.I., and said spectrogram containing no other reflections having a relative intensity of 5 or more.

3. A pigment consisting essentially of the compound defined in claim 1.

4. A white pigment consisting essentially of the compound defined in claim 2.

5. A process for producing a crystalline compound having a composition that can be represented by the formula $CaTiZr_3O_9$ and which, in a typical product is characterized, in its X-ray diffraction spectrogram, by substantial reflections as follows:

| d | R.I. |
| --- | --- |
| 2.93 | 100 |
| 2.53 | 16 |
| 1.79 | 34 |
| 1.53 | 19 | the relative intensities of the several listed reflections with respect to the intensity of the strongest reflection being as set forth in the column headed R.I. and there being in said spectrogram no other reflections having a relative intensity of 5 or more, which comprises calcining in an oxidizing atmosphere to a temperature of at least about 600°C and not substantially above about 1,000°C a chemically homogeneous conglomerate that consists essentially of Ca, Ti, Zr, and O and at least one thermally fugitive ligand per atom of metal component, the oxygen being present in the amount necessary to form the highest oxides of the three metals, said calcining being for a period of at least 2 hours at 600°C.

6. A process as set forth in claim 5 in which said calcining is to a temperature in the range from about 800°C to about 1,000°C.

7. A process as set forth in claim 5 in which in said conglomerate the molar ratio of Ca, Ti, and Zr in the mixture is approximately 1:1:3.

8. A process as set forth in claim 7 in which said calcining is to a temperature in the range from about 800°C to about 1,000°C.

9. A process as set forth in claim 8 in which said conglomerate is formed by drying a coprecipitated mixture.

10. A process as set forth in claim 8 in which said conglomerate is formed by evaporation of a solution containing said metals, oxygen, and thermally fugitive ligands.

11. A process as set forth in claim 9 in which said conglomerate comprises hydrous zirconia, hydrous titania, and calcium oxalate.

12. A process as set forth in claim 10 in which said solution comprises lactates of said metals.

13. A process as set forth in claim 10 in which said solution comprises glycolates of said metals.

14. A process for producing a crystalline compound having a composition that can be represented by the formula $CaTiZr_3O_9$ and which, in a typical product, is characterized by an X-ray diffraction spectrogram in which the most prominent reflections are as follows:

| d | R.I. |
|---|---|
| 7.56 | 7 |
| 3.48 | 11 |
| 2.93 | 100 |
| 2.53 | 21 |
| 2.17 | 6 |
| 1.79 | 51 |
| 1.65 | 6–7 |
| 1.59 | 5 |
| 1.53 | 30 |
| 1.46 | 5–6 | and wherein the relative intensities of the several listed reflections with respect to the intensity of the strongest reflection in the X-ray diffraction spectrogram are as set forth in the column above headed R.I., which comprises calcining, in a non-reducing atmosphere, to a temperature above about 1,250°C a mixture of CaO, $TiO_2$ and $ZrO_2$.

15. A process for producing a crystalline compound having a composition that can be represented by the formula $CaTiZr_3O_9$ and which, in a typical product, is characterized by an X-ray diffraction spectrogram in which the most prominent reflections are as follows:

| d | R.I. |
|---|---|
| 7.56 | 7 |
| 3.48 | 11 |
| 2.93 | 100 |
| 2.53 | 21 |
| 2.17 | 6 |
| 1.79 | 51 |
| 1.65 | 6–7 |
| 1.59 | 5 |
| 1.53 | 30 |
| 1.46 | 5–6 | and wherein the relative intensities of the several listed reflections with respect to the intensity of the strongest reflection in the X-ray diffraction spectrogram are as set forth in the column above headed R.I. which comprises calcining, in a non-reducing atmosphere, the product defined in claim 2 to a temperature above about 1,250°C.

* * * * *